D. R. CLOSE.
VEHICLE SPRING.
APPLICATION FILED FEB. 25, 1907. RENEWED APR. 12, 1909.
949,112. Patented Feb. 15, 1910.
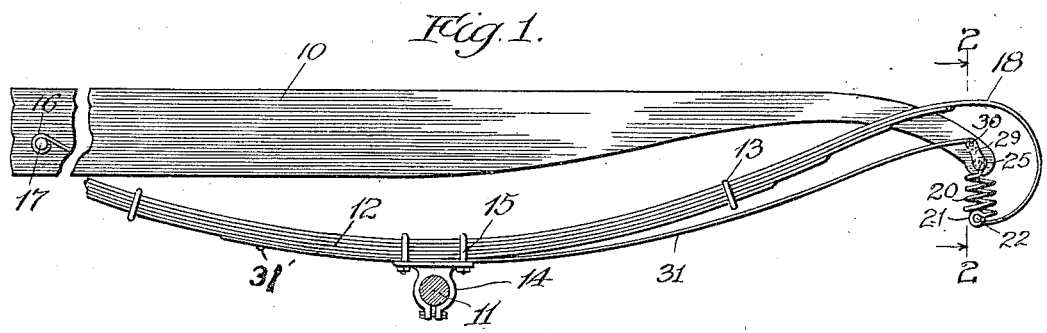
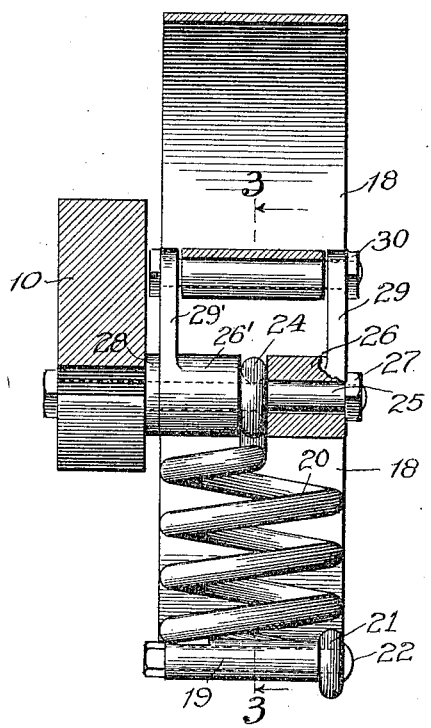
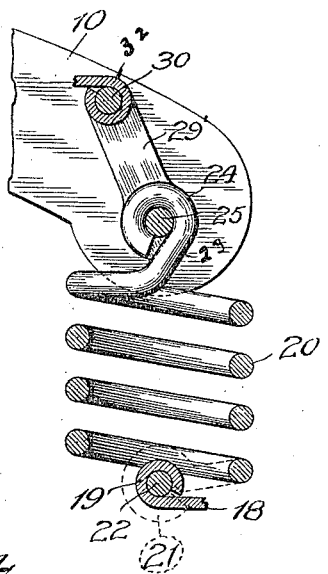
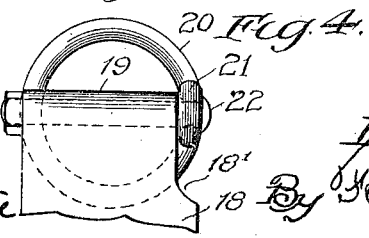
Inventor
Dorr R. Close,

UNITED STATES PATENT OFFICE.

DORR R. CLOSE, OF CHICAGO, ILLINOIS.

VEHICLE-SPRING.

949,112.  Specification of Letters Patent.  Patented Feb. 15, 1910.

Application filed February 25, 1907, Serial No. 359,043. Renewed April 12, 1909. Serial No. 489,523.

*To all whom it may concern:*

Be it known that I, DORR R. CLOSE, a citizen of the United States, residing at Chicago, in the county of Cook and State of Illinois, have invented certain new and useful Improvements in Vehicle - Springs, of which the following is a specification.

My invention relates to improvements in vehicle springs, and has particular reference to the springs for relatively heavy passenger vehicles, such as automobiles.

One of the salient objects of my invention is to provide a structure wherein are interposed between the running gear and the vehicle body, two springs, a primary leaf spring of relative great strength, and a secondary coiled spring of relatively less strength, connected together and both interposed between the running gear and frame, in arrangement simple of construction and highly efficient in operation.

A further object of my invention is to provide such a construction, wherein the effective span, or length of the main or primary leaf spring, at its end associated with the secondary, or coiled spring, is considerably in excess of the longitudinal dimension requisite for its installation.

A yet further object of my invention is to provide improved connections between the primary and secondary springs, and said secondary spring and the vehicle body.

A still further object of my invention is to provide an improved steadying - spring construction for resisting lateral vibrations of the vehicle body.

Other and further objects of my invention will become apparent to those skilled in the art from the following description, taken in conjunction with the accompanying drawing, wherein;

Figure 1 is a side elevation of a spring structure, constructed in accordance with my invention: Fig. 2 is a section on line 2—2 of Fig. 1: Fig. 3 is a fragmentary section on line 3—3 of Fig. 2: and Fig. 4 is a bottom plan view of the connections between the primary and secondary springs.

Throughout the drawing like numerals of reference always refer to like parts.

In the drawing 10 indicates a typical vehicle frame side piece, of a construction common in automobiles.

11 indicates the axle constituting part of the running gear.

12 indicates in general the primary or main spring, the body portion whereof is generally of parti-elliptical shape herein shown as semi-elliptical, and made up of a plurality of leaves or laminæ, which are successively shorter from the uppermost leaf to the lowermost. These laminæ are secured together in any usual or approved manner, as by clamps 13, and the structure is shown as secured to the axle, as by a bracket 14 and clamp 15, in a manner well known in the art. At its extremity adjacent the middle of the vehicle the spring member 12 has its uppermost leaf or leaves, formed in an eye 16, and connected with the pin 17, carried by the body of the vehicle, in a manner well known in the art, and which connection is typical of any suitable association of the "inner" end of the spring, with the vehicle frame member 10. The outer extremity of the uppermost leaf, indicated at 18, is bent back upon itself, being preferably contorted to extend in a free under-curve above the point of connection of the spring structure to the extremity of the frame member 10, around in rear thereof, and inward or backward to a point in vertical alinement to the connection point to be established, and normally at a suitable distance from said point of connection. Thus it will be seen the effective length of the spring, which is the total linear dimension of the uppermost leaf 18, is greater than the longitudinal dimension of the area occupied by the spring as an entirety, so that a relatively long spring effect with a relatively small space requirement is secured. It will also be observed that the leaf spring structure as a whole comprises two portions acting harmoniously, yet in different manners, as the semi-elliptic portion 12 of the spring, with its chord substantially horizontal, has connected therewith the part 18, which constitutes a scroll portion with its chord vertical. Obviously pressure applied to the lower extremity of the scroll portion 18, approximately below the intersection of the vertical and horizontal chords, causes both a depression of the semi-elliptic portion and an elongation of the scroll portion, so that the leaf spring structure as a whole comprises two distinct spring-elements, which in this instance are integrally connected.

Connected between the free extremity of the scroll portion 18 of the leaf spring structure and the extremity of frame member 10, I provide a coiled spring structure, preferably a single spring, generally indicated at 20 arranged wholly within the scroll and approximately vertically. To this end I preferably bend the free extremity of spring leaf 18 into an upwardly projecting eye 19, and form on the coiled spring 20 an alining eye 21. Through this eye 21 of the coiled spring and the eye 19 of the main spring leaf 18 passes a bolt 22 connecting the two springs. The upper end of the secondary coiled spring 20 is bent inward on a radial line, preferably at right angles, to the axis to axial position, as indicated at 23, and is then contorted to form a vertical eye 24 with its center in the axial line of the spring. The eye 24 is of suitable size to receive a stud 25 projecting laterally from a suitable portion of the frame-member 10.

In the strength relation of the scroll portion 18 of the primary spring and secondary spring 20, the secondary spring should be of such character that it is capable of supporting the vehicle body and its normal or calculated load without quite reaching its tension limit. The scroll portion 18 of the leaf spring structure should be of sufficiently greater strength to be but little affected by the normal load of the vehicle but is obviously of less strength than the semi-elliptic portion 12 with which it is connected, so that in practice the relatively light spring 20 may take up the sharp vibration incident to the running of the vehicle, while the spring scroll 18 will receive and absorb the heavier shocks which the secondary spring 20 is incapable of absorbing, both the spiral and the scroll, however, yielding more readily than the semi-elliptic portion 12, so that under severe shock the coiled spring may compress vertically to practically a solid cylinder, the spring scroll may elongate until it becomes very stiff, and the semi-elliptic portion may yield downward; thereby obtaining three distinct spring actions from the coiled spring and the leaf spring structure. Further I prefer, as to the relative sizes of the springs, that the spring leaf 18 should be of a width as great as or not much less than the diameter of the coiled spring 20, and that the stud or other connection 25, projecting from the vehicle body should extend transversely across the entire width of the spring 20, so that when heavy shocks to the running gear cause the solid compression of spring 20, said spring through the bearing of its upper and lowermost convolutions upon the stud 25, and the spring leaf 18, may form a practically solid connection between such parts, and the chance of breakage of said spring 20, or its connection with the primary spring and vehicle thereby minimized. As indicated at 18' in Fig. 4, however, the extremity of spring 18 may be narrowed somewhat to afford room for the eye 21 of the coiled spring.

While the spring structure which I have thus far described, is susceptible of use under some conditions without means for restricting lateral swing of the vehicle body, and may be used in some environments with any suitable means to that end, I have devised means for minimizing the side swings of the body, particularly adapted for installation in conjunction with the spring structure which I have heretofore described, and which side-swing-restraining structure I will now describe.

26, 26' represent duplicate sleeves surrounding the stud 25 on opposite sides of the spring eye 24, such sleeves at their adjacent ends bearing against said spring eye 24 and at their outer ends bearing respectively against a lock nut 27 upon the stud 25, and a washer 28 which finds bearing against the frame 10. At the outer extremities of the sleeves 26, 26', are provided upwardly extending arms or lugs 29, 29' cross connected at their free extremities by a pin 30.

31 indicates a leaf spring extending from the axle and secured to the cross connection 30 between links 29, 29'. Preferably the inner extremity of said spring 31 is secured immediately below the spring 12 by the same clamp 15, and may further be riveted to the bottom lamina thereof, as by rivet 31'. The free or outer extremity of the spring 31 is coiled into an eye 32 which surrounds the pin 30. It will be understood that the sleeves 26 26' with their arms 29 29' are free to turn upon the stud 25, so that as vertical motion takes place between the outer extremity of frame 10 and the running gear 11, the links 29 29' may pivot upon the stud 25 to form a compensating connection between spring 31 and the frame. The greatest sectional dimension of the spring 31 being, however, transverse with respect to the frame, and the lateral connection of the spring 31 at both ends to the frame and running gear being relatively rigid, said spring 31, it will be obvious, will efficiently resist side swinging tendencies of the frame with respect to the running gear.

Thus it will be seen that, broadly considered, I provide a parti-elliptic spring member of suitably great strength; a lighter spring-scroll extending from the end of the horizontal chord of the parti-elliptic spring, to a point in vertical alinement therewith; and a coiled or spiral spring connected to the end of the scroll and lying therein along the vertical chord of the scroll; so that the thickest part or base of the parti-elliptic spring and the remote or inner end of the coiled spring (lying within the scroll) may be connected one with the body and the other with the running gear, interposing the spring elements between the vehicle parts in such manner that under stress the coiled spring compresses, the spring scroll elongates, and the parti-elliptic portion straightens. And in conjunction with such construction, I provide a laterally substantially-rigid connection between the said inner end of the spiral spring and the parti-elliptic portion of the leaf spring, movable in the vertical plane of the spring scroll, to permit free action of the springs in a vertical plane but substantially preventing displacement of the inner end of the coiled spring from the vertical plane in which lie the scroll and parti-elliptic spring elements.

While I have herein described in some detail a specific embodiment of my invention which I have found to be advantageous, and the details of which I may herein claim, it will be obvious that in its broader aspect my invention is not limited to such specific construction, and that considerable departure may be made in the embodiment of my invention without departure from the spirit and scope.

Having thus described my invention, what I claim and desire to secure by Letters Patent, of the United States, is:

1. The combination with a vehicle running gear member, and a frame member, of a leaf spring structure connected with the running gear member, having an uninterrupted leaf at its extremity curled back upon itself, and a coiled spring interposed within the curled portion between the extremity of the curl of the leaf spring and the vehicle body.

2. In combination with a vehicle running gear member, and a frame member, provided with a laterally projecting part, of a relatively strong, semi-elliptical spring attached to the running gear member between its ends, at its inner end suitably connected with the frame member, and at its outer end curled above, beyond, and back below the projection of the frame, and a coiled compressible spring interposed between the extremity of the semi-elliptical spring and the projection from the frame.

3. The combination with a vehicle running gear member, and a frame member, of a relatively strong semi-elliptical spring composed of leaves, attached to the running gear member between its ends, with its inner end suitably connected with the frame member and with its outer end composed of a single leaf curled downwardly and inwardly, a lateral projection from the frame, and a coiled compressible spring, proportioned to approximately balance the normal load carried by the vehicle frame, interposed between said projection and the extremity of the leaf spring.

4. The combination with a vehicle running gear member, and a frame member having a projection therefrom, of a relatively strong spring composed of leaves attached to the running gear member, and extending above, beyond and back below the projection to a point therebeneath, and at its extremity provided with an eye, a coiled spring having one end connected with the frame projection and its opposite terminal portion formed into an eye, and a bolt connecting the said eyes in the leaf spring and the coiled spring.

5. In combination with a vehicle running gear member and a frame member, a spring structure for absorbing the vertical shock, comprising a leaf spring member attached to the running gear, and at its free extremity curled back on itself, and a coiled spring member within said curled portion connected between said extremity of the leaf spring member and the frame, and means for restraining lateral motion of the frame member with respect to the running gear member, comprising an auxiliary spring arranged with its greatest sectional dimensions horizontally disposed, connected for longitudinal lost motion between the running gear member and the frame member.

6. The combination with a vehicle running gear member and frame member, having a projection therefrom, of a leaf spring structure attached to the running gear member, a compressible coiled spring interposed between the extremity of the leaf spring member and the projection upon the frame member, a swinging link pivoted to the projection from the frame member, and a leaf spring arranged with its greatest cross sectional dimension horizontal, connected between the running gear member and said swinging link.

7. The combination with a vehicle running gear member and a frame member having a projection therefrom, of a leaf spring construction attached to the running gear member, and at its free extremity curled back upon itself to underlie the projection upon the frame, a coiled spring interposed between the extremity of said leaf spring and the projection of the frame, two pivotal links mounted on said projection on opposite sides of the connection of the coiled spring, a cross connection between said links and a side-motion-restraining spring at its inner extremity connected with a suitable part of the leaf spring structure, and at its outer extremity connected with the cross connection between said swinging links.

8. The combination with a vehicle running gear member and a vehicle frame member, of a spring structure comprising a parti-elliptic leaf spring portion with its chord substantially horizontal; a scroll spring portion, extending from the end of the parti-elliptic portion, with its chord substantially vertical, and a coiled spring arranged within the scroll, with its outer end connected to the extremity of the scroll; the inner end of said coiled spring and the base of the parti-elliptic spring portion being connected one to the running gear and the other to the frame of the vehicle, whereby the load on the vehicle tends to compress the coiled spring within the scroll, elongate the scroll, and straighten the parti-elliptic spring portion.

9. The combination with a vehicle running gear member and a vehicle frame member, of a spring structure comprising a parti-elliptic leaf spring portion with its chord substantially horizontal; a scroll spring portion integral therewith, extending from the parti-elliptic portion, with its chord substantially vertical, and a coiled spring arranged within the scroll, with its outer end connected to the extremity of the scroll; the inner end of said coiled spring and the base of the parti-elliptic spring portion being connected one to the running gear and the other to the frame of the vehicle, whereby the load on the vehicle tends to compress the coiled spring within the scroll, elongate the scroll, and straighten the parti-elliptic spring portion.

10. The combination with a vehicle running gear member and a vehicle frame member, of a spring connection therebetween comprising a leaf spring structure and a coiled spring; said leaf spring structure providing a semi-elliptic spring portion, with its chord substantially horizontal, and a scroll portion, integral therewith, with its chord substantially vertical; and having arranged therein, substantially along said chord, the coiled spring, the outer end of which is connected to the extremity of the scroll; and a vertically movable, laterally substantially-rigid connection between the inner end of the coiled spring and the semi-elliptic spring maintaining the coiled spring against displacement of its inner end from the plane of the scroll.

11. The combination with a vehicle running gear member and a frame member, of a part 25 connected to one of said members, a coiled spring at its inner end engaging said part 25, a link pivotally engaging said part and extending therefrom oppositely to the coiled spring, a leaf spring structure providing a spring scroll engaging the outer end of the coiled spring and half encircling said coiled spring to a point above the said link, and providing also a semi-elliptic spring portion carrying said scroll and connected to the other of said vehicle members; and a vertically movable, laterally substantially-rigid connection between the outer end of the pivoted link and the body of the semi-elliptic spring portion.

In testimony whereof I hereunto set my hand in the presence of two witnesses.

DORR R. CLOSE.

In the presence of—
  Geo. T. May, Jr.,
  Mary F. Allen.